Sept. 21, 1926.  1,600,400
C. A. CHRISTOFFERSON
DEFLECTING MEMBER FOR INSIDE PIPE CARRIERS
Filed Sept. 15, 1924   3 Sheets-Sheet 1
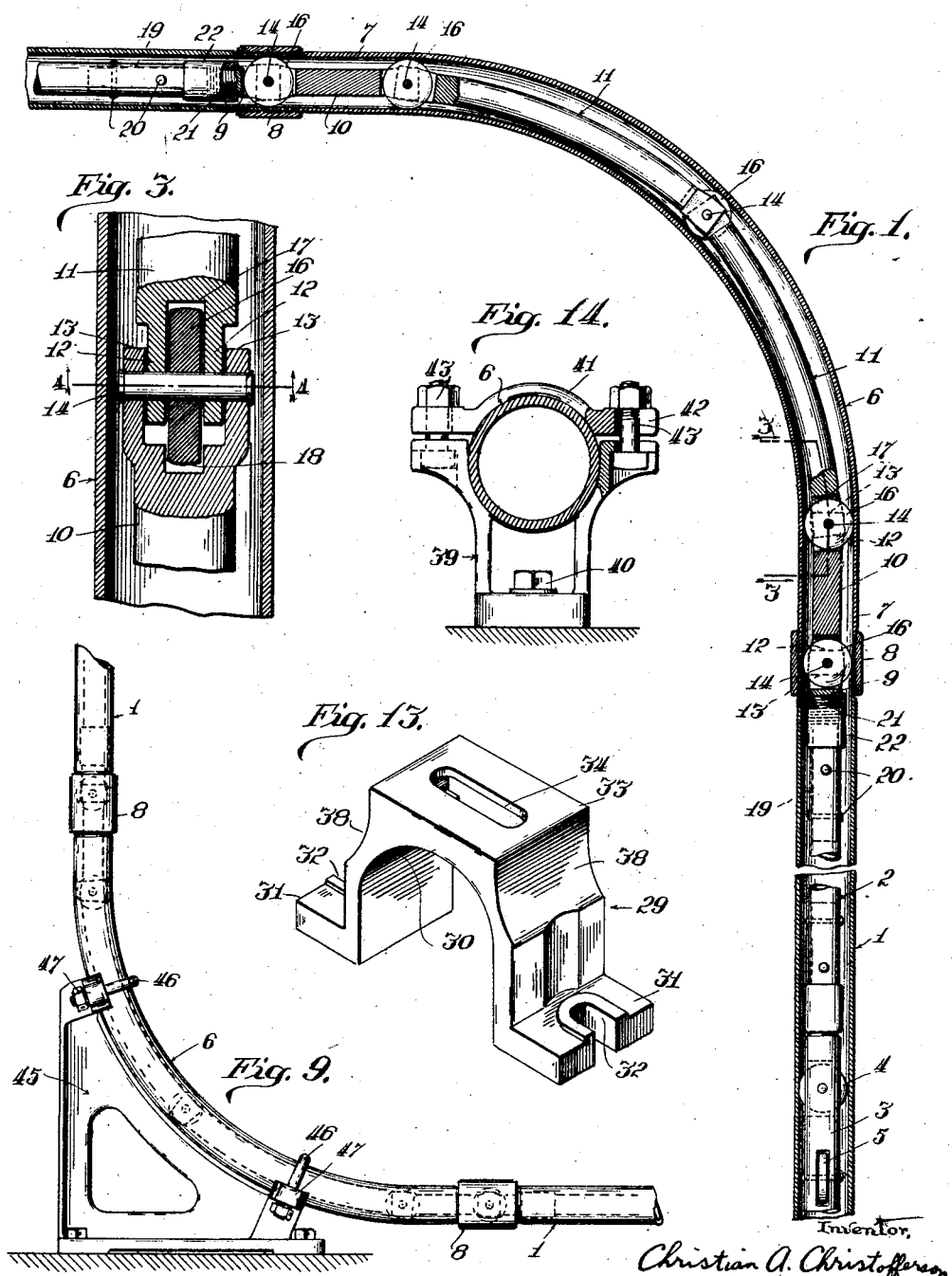

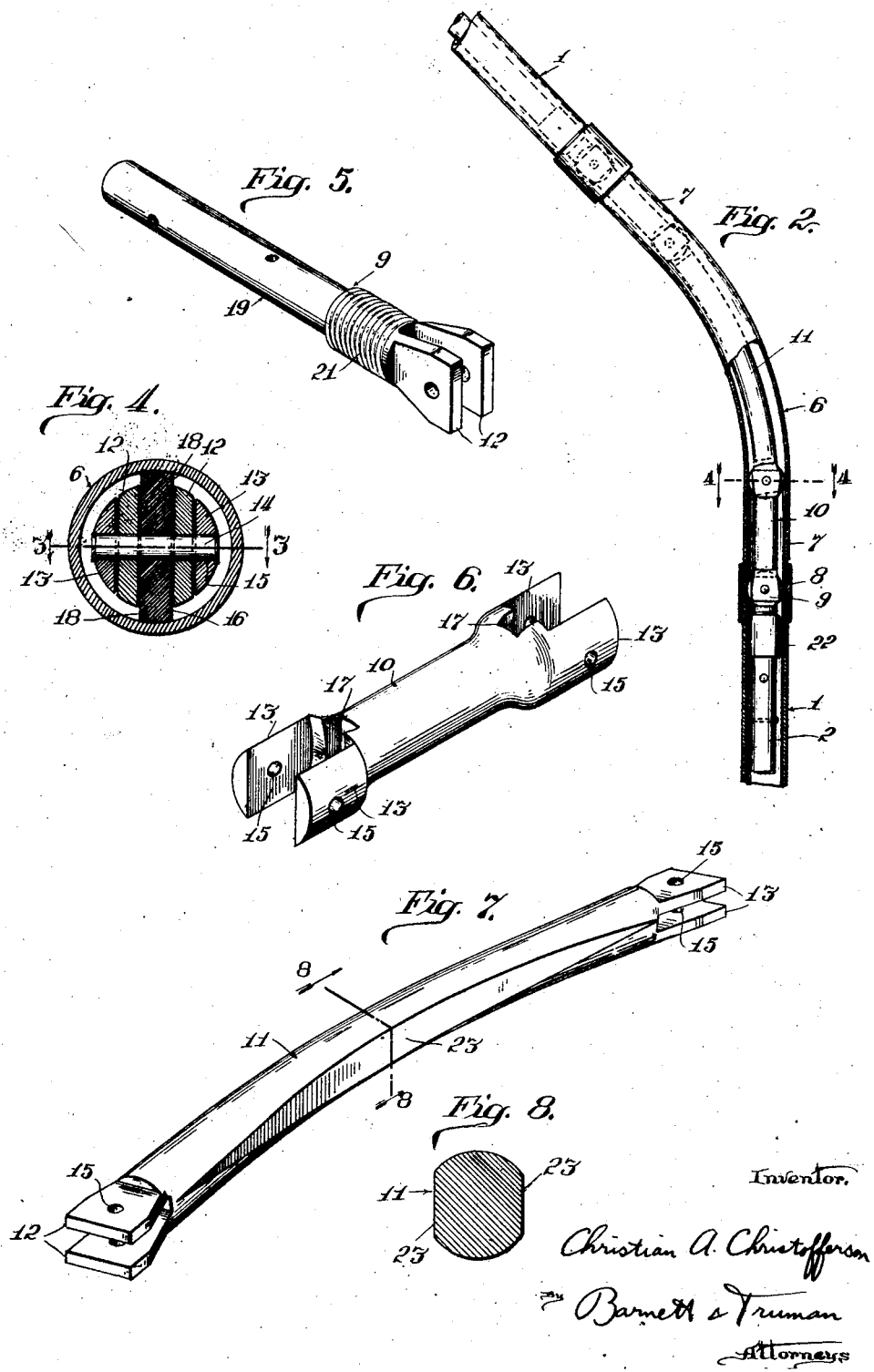

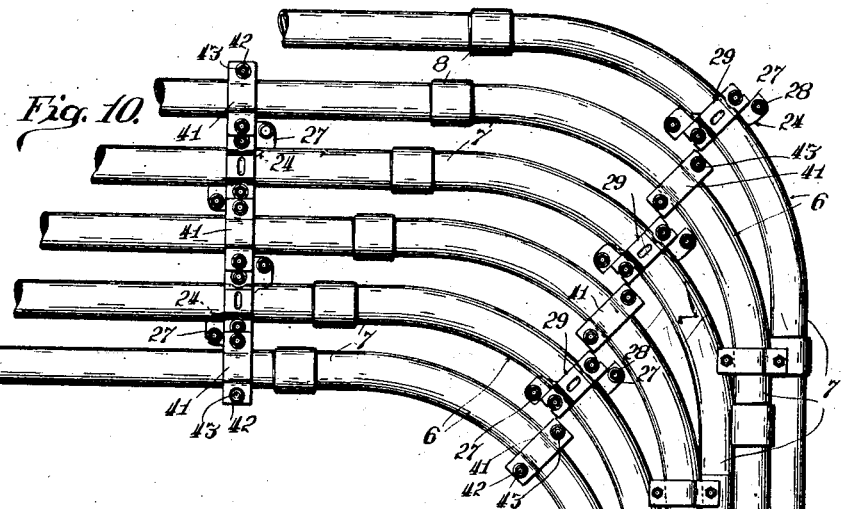
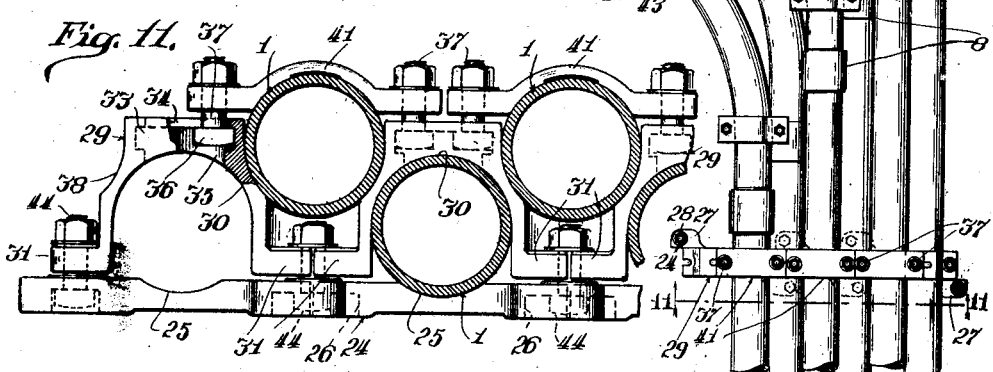
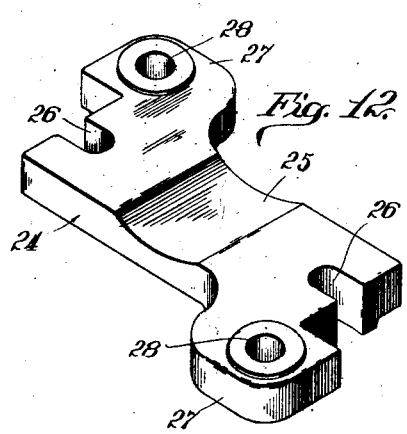
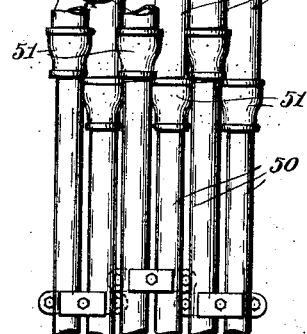

Patented Sept. 21, 1926.

1,600,400

UNITED STATES PATENT OFFICE.

CHRISTIAN A. CHRISTOFFERSON, OF ST. PAUL, MINNESOTA, ASSIGNOR TO CHICAGO RAILWAY SIGNAL AND SUPPLY COMPANY, OF CARPENTERSVILLE, ILLINOIS, A CORPORATION OF ILLINOIS.

DEFLECTING MEMBER FOR INSIDE PIPE CARRIERS.

Application filed September 15, 1924. Serial No. 737,818.

This invention relates to improvements in reciprocatory mechanism for transmitting power, for example, to operate railway signal apparatus from a distance, and relates more particularly to an improved means for deflecting this power through convenient arcs when it becomes necessary to change the direction of power transmission, and for easily and economically mounting the transmission and supporting units in compact assemblies.

The principal objects of the present invention are to provide a device of this kind, operating in a closed stationary pipe whereby all working parts are protected from the weather and external objects, in which friction is reduced to a minimum, in which the power may be transmitted around comparatively sharp curves without excessive loss of power, and in which a plurality of the power transmitting units may be compactly grouped and easily assembled and mounted in position.

Other objects and advantages of the invention will be apparent from the following detailed description of certain approved forms of the apparatus.

In the accompanying drawings:

Fig. 1 is a longitudinal central section through a portion of the power-transmitting mechanism, showing one 90° deflecting member and portions of the two connected straight runs of the pipe carrier.

Fig. 2 is a similar view showing a member for deflecting the power through approximately 45°.

Fig. 3 is a longitudinal central section on an enlarged scale, taken on the line 3—3 of either Fig. 1 or Fig. 4.

Fig. 4 is a transverse section taken substantially on the line 4—4 of either Fig. 2 or Fig. 3.

Fig. 5 is a perspective view of one of the end links with the long tang ends, for connecting the deflecting member with one of the straight runs of the power transmission member.

Fig. 6 is a perspective view of one of the short, straight, end links.

Fig. 7 is a perspective view of one of the long curved links operating in the deflecting member.

Fig. 8 is a transverse section taken substantially on the line 8—8 of Fig. 7.

Fig. 9 is an elevation showing the supporting member for a deflecting member between horizontal and vertical runs of the pipe carrier.

Fig. 10 shows an assembled group of horizontal pipe carriers, and the grouping of the deflecting members for turning these carriers through approximately 90°.

Fig. 11 is a transverse vertical section, on an enlarged scale, taken substantially on the line 11—11 of Fig. 10.

Fig. 12 is a perspective view of one of the base plates of the pipe supporting mechanism.

Fig. 13 is a perspective view of one of the arched clamps, cooperating with the base plate shown in Fig. 12 for supporting one of the pipes in the lower row as shown in Figs. 10 and 11.

Fig. 14 is an elevation of one of the supporting units for carrying one of the pipes in the upper row.

In systems for operating railway switches and signals, from a distance, it is common to connect the switches and signals to be operated with a series of cooperating levers in a central tower, such connection being effected by the use of pipes or rods and levers, a single line of connecting piping serving to cause the desired movement at the switch or the signal at a considerable distance from the central point. In some systems of this type in use heretofore, it has been customary to enclose the operating pipe or rod within an outer pipe of larger diameter at points where special protection has been necessary, as at the point where such a line of pipe crosses the street or roadway. Such protecting pipes have been closed at their end about the operating pipe by suitable stuffing boxes, and the outer pipes have ordinarily been kept filled with oil or other suitable lubricant. Such constructions have been objectionable for the reason that the outer pipe is worn through rapidly in many cases, permitting the oil to escape and permitting the entrance of rain, snow, grit, etc. Moreover, even in cases where the protecting pipe has remained for a long period intact, the friction has been very great, serving to reduce very materially the distance at which a signal or switch can be operated from the tower, in cases where any considerable portion of the line of operating pipe has been enclosed, as above described.

In my copending application, Serial No. 463,535 filed April 22, 1921, (now Patent No. 1,541,791, issued June 16, 1925,) is disclosed and claimed an improved form of anti-friction pipe carrier, in which the friction is reduced to a minimum, and the wear of the parts greatly reduced. A portion of such a mechanism is shown at the lower end of Fig. 1, wherein 1 is the outer stationary enclosing pipe, in which the power transmission member is supported and operates. This power transmission member consists of straight sections of smaller piping 2, connected at suitable intervals by coupling bars 3 in which operate rollers 4 and 5 mounted at right angles to one another, and having a close working fit within the outer pipe 1. These coupling bars 3 are placed at sufficiently close intervals to prevent buckling or distortion of the power transmitting pipe 2, and the guiding and supporting rollers 4 and 5 reduce the friction to a minimum.

One feature of the present invention is an improved apparatus for transmitting power from one mechanism of the type just briefly described, to another similar mechanism located in a different plane. Referring first to Figs. 1 to 8 inclusive, 6 indicates the outer stationary supporting pipe of the deflecting member. The central portion of pipe 6 will be curved on a suitable arc (shown as 90° in Fig. 1), but a substantial length of each end portion is straight as shown at 7, and connected with the adjacent end of pipe 1 by a coupling.

The power transmission member for operating in this deflecting pipe 6, comprises a pair of end links 9 for connecting with the end sections of the straight runs of the power transmitting mechanism, short end links 10 operating in the straight portions 7 of the deflecting member, and one or more longer curved links 11 as hereinafter described. The inner end of each link 9, and both ends of links 10 and 11 are provided with connecting yokes comprising a pair of parallel flanges 12, as shown in Fig. 5, or similar flanges 13 spaced somewhat further apart as shown in Fig. 6. The flanges 13 are adapted to overlap the flanges 12, and the two adjacent link ends are secured together by pintles 14 mounted in rotary bearings 15 in the flanges 12 and 13, as best shown in Figs. 3 and 4. A roller 16 is mounted on the pintle 14 between the flanges 12, and the outer portion of its periphery may project into a recess or cutaway portion 17 in the links provided with flanges 13. This roller 16 has a size and shape adapted to give it a close working fit within the outer stationary pipe 6, its outer diameter being substantially the same as the inner diameter of pipe 6, and the outer rolling peripheral surface of the roller being curved on an arc substantially the same as the inner arc of the pipe, as shown at 18 in Fig. 4. Preferably the links, rollers, and pintle pins, are all made of dissimilar metals, for example, the links may be made of forging steel, the rollers of cast steel and the pintle pins of phosphor bronze. The purpose of this is to prevent rusting and consequent jamming of the parts at the bearing surfaces. It has been found that when these parts are all made of the same metal, rusting will occur due to the moisture which will in time inevitably find its way into the enclosing pipe, and this will cause the bearing surfaces to stick and cause increased friction and wear of the parts. By making these several parts of dissimilar metals, as mentioned above, this corrosive action is practically eliminated.

Each end link 9 is provided with a long tang end 19, adapted to project into the adjacent end of the power transmission pipe 2 and be secured therein by suitable rivets 20 as shown in Fig. 1. The end of link 9 adjacent the flanges 12, is threaded as at 21, and adapted to be engaged by an internally threaded coupling sleeve 22 screwed on to the correspondingly threaded end of pipe 2 as shown in Fig. 1. In this manner the end links 9 are made substantially integral and rigid with the ends of the power transmission pipe 2 adjacent to the deflecting members. The roller 16 at the end of link 9 serves as a guide for this end of the power transmission member. The short link 10 may be made of any suitable size, having a loose working fit within the pipe 6 and is of a length substantially the same as that of the straight end portion 7 of he pipe 6.

The longer links 11 operating in the curved portion of pipe 6 are curved from end to end on an arc somewhat greater than that of the supporting pipe in which they operate. By curving these links the number of points of rolling contact with the pipe may be reduced, and at the same time sliding friction prevented between the central portions of the link and the enclosing pipe. By cutting away, as shown at 23, those portions of links 11 lying substantially in the plane of curvature of the link, a link with a larger radius of curvature can be operated in a pipe of smaller radius. In order that these links may provide the necessary resistance to buckling or distortion, it is desirable that their radius of curvature be as large as possible. At the same time the smaller this radius of curvature of the link, the longer the link may be made. The links used according to the present invention, are designed to reduce the points of rolling contact to a minimum, and still provide sufficient strength in the link members 11. It will be noted that the bearing flanges at the link ends are so positioned that the axes of rollers 16 will be at right angles to the plane of curvature of the deflecting member.

When the deflecting members have a rather large curvature, such as the 90° curve shown in Fig. 1, two of these long links 11 will ordinarily be needed. However, when the curvature is smaller, as for example the 45° curve shown in Fig. 2, one of these links 11 will ordinarily suffice. For a very small curvature a few of the short links 10 may be used in lieu of the curved links 11.

When the power transmitting member is pushed or pulled through the enclosing pipe, the rollers 16 will roll along the inner surface of the pipe without permitting any material lateral play of the power transmission member, and holding all portions of all of the links at all times out of contact with the enclosing pipe 6. It will be noted that the rollers 16 are all in one plane, (the plane of curvature of the deflecting member), and there are no rollers at right angles thereto, as used in the straight runs, one being indicated at 5 at the lower end of Fig. 1. The pressure between the rollers and the inner wall of pipe 6 will always be in the plane of curvature, and even though the rollers should wear, or for other reasons not have a close fit within the pipe, they will ride up when the power transmitting member is under tension or compression, and travel on the center of the pipe along the plane of curvature. Rollers at right angles thereto, such as 5 in the straight runs, are not only unnecessary but would tend to bind against the side walls of the pipe and increase the friction.

In the standard mode of assembling a plurality of these power transmission members, in railway signal installations or other similar work the units must be spaced either 2¾ inches or 5 inches between centers. In the usual straight runs of the members, the pipes are assembled in parallel relation with their centers in the same horizontal plane and with 2¾ inches between centers, 2 inch piping being used for the outer casings. This grouping is indicated at 50 at the lower end of Fig. 10. Experience has demonstrated that 2 inch piping does not allow sufficient size to the various parts to give the desired strength to the deflecting members, and in these portions of the installation 2½ inch piping is used. The couplings between the 2 inch and the 2½ inch pipes are indicated at 51 in Fig. 10.

It therefore becomes necessary before reaching a curve to slightly deflect up every alternate pipe in the series, so that the pipes are positioned in two parallel horizontal rows, every alternate pipe being in the upper row. Such a grouping is shown in Figs. 10 and 11, and requires no greater ground area than the smaller piping. Since the curvature of the deflecting members are all the same, this closely assembled grouping cannot be maintained when going around a curve, but the individual pipes must be spaced somewhat further apart at the centers of the curves. Also, it is sometimes desirable to group the straight runs of the pipes further apart (one five-inch centers) as shown at the upper portion of Fig. 10.

For these purposes, special forms of supporting members have been designed, adapted for use with any of these different arrangements of the pipe units. These supporting stands are shown more particularly in Figs. 10 to 14 inclusive.

A base plate 24 is provided with a central arcuate depression 25 for supporting the lower portion of one of the pipes in the lower row, and with an open ended bolt-receiving slot 26 at each end of the plate. At one side of each end of the plate is an ear extension 27, adapted to engage around the end of an adjacent base plate 24 as shown in the lower half of Fig. 10 and each ear 27 is provided with an aperture 28 through which suitable anchoring means may be passed to secure the base plate to a cross-tie or other equivalent supporting means. An arched clamp 29 (shown in Fig. 13), is provided with a lower arcuate recess 30 adapted to bridge over the top of one of the lower pipe members. A flange 31 at each end of the member 29 has an open-ended bolt-receiving slot 32 adapted to mate with the slot 26 in the base plate 24 whereby these two members may be secured together to support and hold in place one of the lower pipes. In the top of the arch 33 of member 29 is a bolt slot 34 communicating with a larger interior recess 35 of a size suitable to accommodate and hold in place the head 36 of a bolt 37. The upper portion of each leg of the arch 29 has an arcuate seat 38 for supporting one side of one of the pipes as hereinafter described.

In Fig. 14 is shown a supporting unit for one of the pipes in the upper row. Each of these supports comprises a base-stand 39, adapted to be mounted upon a cross tie or other supporting member by means of securing bolts 40, and a cover-plate 41 having an open ended slot 42 at each end whereby the cover plate is secured to the base stand by means of a bolt 43. Mating arcuate recesses in the base-stand and cover-plate are adapted to fit about one of the pipes in the upper row.

Where the pipes are spaced comparatively far apart, as with the straight ones at the upper end of Fig. 10, and where the deflecting members are grouped at the central portion of Fig. 10, each lower pipe is supported at suitable intervals by one of the lower supporting units comprising a base plate 24, and an arched clamp 29, and each upper pipe is independently supported at suitable intervals by one of the supporting units comprising a base-stand 39 and cover-plate 41. Where the pipes are grouped closely together, in overlapping relation, as shown at the lower portion of Fig. 10, the base-plates 24 are grouped in longitudinal interlocking relation, with the ears 27 at the ends of the base plates overlapping the ends of the adjacent plates. One of the pipes in the lower row is supported in recesses 25 of each base plate, and one of the arched clamps 29 is placed over each pipe with the ends of flanges 31 of adjacent clamps in contact with one another. Each pair of adjacent flanges 31 may then be secured to a pair of adjacent ends of the base plate 24 by a single bolt 44 as indicated in Fig. 11; the opposed recesses 38 in an adjacent pair of the arched clamps will now be spaced the proper distance apart to support one of the pipes in the upper row as indicated in Fig. 11. A cover-plate 41 is now secured over this upper pipe by means of bolts 37 anchored in recesses 35 in the arched clamp, as heretofore described. It will be noted that in this closely grouped assembly, the base-stands 39 are omitted entirely.

When the run of one of the power transmitting units must be changed from the horizontal to the vertical, the deflecting member 6 is supported upon an arcuate stand 45 as shown in Fig. 9. The pipe is held in place by yoke-bolts 46 secured to flanges or projections 47 on the arcuate support 45.

When power transmitting units of this type are used, since no moving parts are exposed and the pipes may be wholly or partially buried if desired, the hazard to trainmen and damages from dragging equipment are practically eliminated. The pipe lines may be laid in any desired location, close to a track, and friction is reduced to a minimum and the switches or signals may be operated from a considerable distance.

With the use of the deflecting members here disclosed the pipes may be carried around any desired curves, either in the horizontal or vertical plane, and the supporting members here disclosed may be assembled to support either the closely grouped straight runs of the pipe or the more widely separated curved runs.

I claim:

1. In reciprocatory power transmission mechanism, a direction-changing means consisting of a stationary curved pipe, and a power transmitting member therein comprising a plurality of connected rigid links at least one of which is curved longitudinally on a longer radius than that portion of the pipe in which it operates.

2. In reciprocatory power transmission mechanism, a direction-changing means consisting of a stationary curved pipe, and a power transmitting member therein comprising a plurality of connected rigid links, at least one of which is curved longitudinally on a longer radius than that portion of the pipe in which it operates, the portion of this link intermediate its ends being cut away on the side toward the center of curvature to prevent contact of this portion of the link with the enclosing pipe.

3. In reciprocatory power transmission mechanism, a direction-changing means consisting of a stationary curved pipe, and a power transmitting member therein comprising a plurality of connected rigid links, each link having a main body portion curved to substantially conform with the curvature of the pipe within which it is enclosed and having a yoke at each end, the yoke at the end of one link overlapping the yoke at the end of the adjacent link, a pivot pin connecting the yokes, and a roller mounted on each pin and having its periphery curved transversely to conform with the inside surface of the pipe along which it travels.

4. In reciprocatory power transmission mechanism, a direction changing means consisting of a stationary pipe having straight end portions connected by a curved central portion, and a power transmission member therein comprising a plurality of rigid links connected end to end, the end links of the series being straight and the central links being curved.

5. In reciprocatory power transmission mechanism, a direction changing means consisting of a stationary pipe having straight end portions connected by a curved central portion, and a power transmission member therein comprising a plurality of rigid links connected end to end, the end links of the series being straight and the central links being curved on a longer radius than that portion of the pipe in which they operate.

6. In reciprocatory power transmission mechanism, a direction changing means consisting of a stationary pipe having straight end portions connected by a curved central portion, and a power transmission member therein comprising a plurality of rigid links connected end to end, the end links of the series being straight and the central links being curved, the links being smaller in cross-section than the interior of the pipe, and rollers mounted on the connecting pivots for the links and having a close working fit with the interior of the pipe.

7. In reciprocatory power transmission mechanism, a direction changing means consisting of a stationary pipe, and a power transmitting member therein comprising a plurality of rigid links, pivots connecting the ends of adjacent links, and a roller mounted on each pivot and having a close rolling fit within the pipe, the rollers, pipe and pivots being formed of dissimilar metals, for the purpose specified.

8. In reciprocatory power transmission mechanism, a direction changing means consisting of a stationary pipe, and a power transmitting member therein comprising a plurality of forged steel links, pivot pins of phosphor bronze connecting the ends of adjacent links, and a cast steel roller mounted on each pivot pin and having a close working fit within the pipe.

CHRISTIAN A. CHRISTOFFERSON.